United States Patent [19]

Lee

[11] Patent Number: 5,295,638

[45] Date of Patent: Mar. 22, 1994

[54] REEL DRIVING APPARATUS FOR A VIDEOCASSETTE RECORDER

[75] Inventor: Hyun-Moo Lee, Incheon, Rep. of Korea

[73] Assignee: Daewoo Electronics Co., Ltd., Seoul, Rep. of Korea

[21] Appl. No.: 38,016

[22] Filed: Mar. 29, 1993

[30] Foreign Application Priority Data

Mar. 31, 1992 [KR] Rep. of Korea .................. 92-5400

[51] Int. Cl.⁵ .................. B65H 20/38; G11B 15/44; G11B 15/18
[52] U.S. Cl. .................. 242/201; 242/200
[58] Field of Search ............. 242/200, 201; 360/96.3, 360/96.4

[56] References Cited

U.S. PATENT DOCUMENTS 4,328,520 5/1982 Iwata et al. ................. 360/73
4,663,681 5/1987 Kodama ................. 360/96.3
4,711,410 12/1987 Gwon ................. 242/201

*Primary Examiner*—Daniel P. Stodola
*Assistant Examiner*—John Q. Nguyen
*Attorney, Agent, or Firm*—William F. Pinsak

[57] ABSTRACT

A reel driving apparatus for a videocassette recorder capable of preventing image distortions, failures and noises during the switching of operation modes. The reel driving apparatus comprises a base plate, a supply reel and a take-up reel rotatably mounted on the base plate, an idler disposed between the supply reel and the take-up reel for transmitting selectively its driving force to either the supply reel or the take-up reel, a first and a second swing arms rotatably pivoted at a first and a second pins of the base plate for shifting the idler clockwise and counterclockwise to drive one of the reels, and a slide plate slidably mounted to the base plate for actuating the swing arms by its forward and backward movement.

3 Claims, 3 Drawing Sheets

REEL DRIVING APPARATUS FOR A VIDEOCASSETTE RECORDER

FIELD OF THE INVENTION

The present invention relates to a reel driving mechanism; and, more particularly, to a reel driving apparatus for use in a videocassette recorder, capable of preventing image distortions and failures especially during the switching of operation modes.

DESCRIPTION OF THE PRIOR ART

As is well known, a videocassette recorder ("VCR") is operated in various modes, e.g., play mode, review mode, rewinding mode and fast forward mode, etc., through the selective operation of the driving mechanisms thereof. Usually, the switching of operation modes is executed by the selective drive of a supply reel and a take-up reel of the VCR. In general, such a driving mechanism includes an idler positioned between the supply reel and the take-up reel, which is shifted clockwise and counterclockwise to transmit selectively its driving force to one of the reels, thereby enabling the VCR to be operated in a certain switched mode.

In this regard, various reel driving mechanisms have been proposed to operate the VCR in a required mode. For example, U.S. Pat. No. 4,663,681 discloses a reel base driving mechanism for use in a VCR, which can increase the pressing contact force between the idler and either the supply reel base or the take-up reel base to thereby reduce the power consumption of the reel motor. In U.S. Pat. No. 4,711,410, there is provided another reel-driving device which can adjust the torque of the reels by setting the radius ratio of the supply reel to the take-up reel at about 1.27-1.5:1. However, although such reel driving mechanisms as disclosed in the above prior art may have been useful for the intended purpose, a common deficiency that exists in these prior art devices is that image distortions, failures and noises may occur due to the looseness of the running videotape during the changing of the operation mode.

A typical reel driving mechanism is shown in FIGS. 1 and 2. FIG. 1 illustrates a schematic plan view of a videotape passage in a VCR. The VCR includes a base plate 20, and a supply reel 1 and a take-up reel 8 rotatably mounted on the base plate 20. A videotape 2 drawn out of the supply reel 1 runs along an eraser head 3, a head drum 4, an audio control head 5, a capstan axis 6 and a pinch roller 7 in order, and then is wound over the take-up reel 8. As shown in FIG. 1, disposed between the supply reel 1 and the take-up reel 8 is an idler 9 which serves to transmit selectively its driving force to one of the reels 1, 8 to thereby feed the videotape 2 in an appropriate operation mode.

Referring to FIG. 2, there is shown an idler driving mechanism which comprises a driving pulley 11 coupled to a capstan motor 10, a driven pulley 13 incorporated with the driving pulley 11 via a belt 12, a driving gear 15 rotatably coupled to a shaft 14 of the driven pulley 13, a first and a second driven gears 16, 17 meshed with the driving gear 15 and to be engaged with the supply reel 1 and the take-up reel 8 in changing the operation mode, and an idler bracket 18 for supporting the respective gears 15, 16 and 17. For example, when the play mode is to be switched on, the capstan motor 10 is rotated in the clockwise direction. As a result, the driving gear 15 is rotated clockwise via the driving pulley 11 and the driven pulley 13 to thereby cause the idler bracket 18 to rotate about the shaft 14 in the clockwise direction by the rotating torque of the gear 15. Accordingly, the second driven gear 17 is engaged with and drives the take-up reel 8 to operate the VCR in the play mode.

In contrast, if it is required to change the operating mode, e.g., from the play mode to the review mode, the capstan motor 10 is rotated counterclockwise to thereby enable the driving gear 15 to rotate in the same direction through the driving operation of the pulleys 11, 13. Therefore, the first driven gear 16 is engaged with the supply reel 1 by the counterclockwise motion of the idler bracket 18 due to the rotating torque thereof and drives the supply reel 1 to thereby attain the review mode.

As discussed above, in accordance with the prior art driving mechanism, since the idler 9 is shifted to drive one of the reels through the drive of the capstan motor 10, there is an interval between the driving initiation of the capstan motor 10 and the shifting completion of the idler 9 due to the delay in the shifting motion of the idler 9. Accordingly, the videotape 2 has been already fed at a substantial length in a certain switched mode prior to the completion of the idler shifting operation, and, therefore, becomes loose to cause image distortions, noises, image failures and the like during the switching of the operation modes.

SUMMARY OF THE INVENTION

Accordingly, it is an object of the present invention to provide a reel driving apparatus for a VCR which is adaptive to shift quickly an idler to prevent a videotape from being loose during the shifting operation of the idler.

It is another object of the present invention to provide a reel driving apparatus for a VCR which is capable of preventing image failures, noises and distortions during the switching of operation modes.

The above and other objects of the present invention are accomplished by providing a reel driving apparatus for a VCR which comprises a base plate, a supply reel and a take-up reel rotatably mounted on the base plate, and an idler disposed between the supply reel and the take-up reel for transmitting selectively its driving force to either the supply reel or the take-up reel, the idler including a driven pulley to be driven by a driving pulley of a capstan motor via a belt, a driving gear coupled to a shaft of the driven pulley, a first and a second driven gears meshed with the driving gear and to be selectively engaged with the supply reel and the take-up reel, respectively, and an idler bracket for supporting the respective gears, the improvement comprising: a first and a second swing arms rotatably pivoted at a first and a second pins of the base plate and associated with the idler bracket for shifting the idler clockwise and counterclockwise to thereby cause the first driven gear to engage with the supply reel and the second driven gear to engage with the take-up reel; means for biasing the second swing arm counterclockwise to cause the idler to be shifted clockwise; a slide plate slidably mounted at guide pins of the base plate for actuating the first and the second swing arms; and a cam gear for moving the slide plate in the forward and backward directions through an actuating lever, wherein the actuating lever is rotatably mounted at a pivot pin of the base plate at a middle portion thereof, one end of the lever being pivoted at a side of the slide plate and the other end being located in a cam groove of the cam gear.

The idler bracket has a pair of legs arranged in an opposite relationship with each other. The respective swing arms have first ends engaged with the legs of the idler bracket and second ends arranged in a generally perpendicular relationship with respect to the first ends thereof. The slide plate has projections which are in contact with the second ends of the swing arms so as to actuate the swing arms through the sliding movement thereof.

BRIEF DESCRIPTION OF THE DRAWINGS

The above and other objects, and features of the present invention will become apparent from the following descriptions, taken in conjunction with the accompanying drawings.

DETAILED DESCRIPTION OF THE PREFERRED EMBODIMENTS

Figure 1:
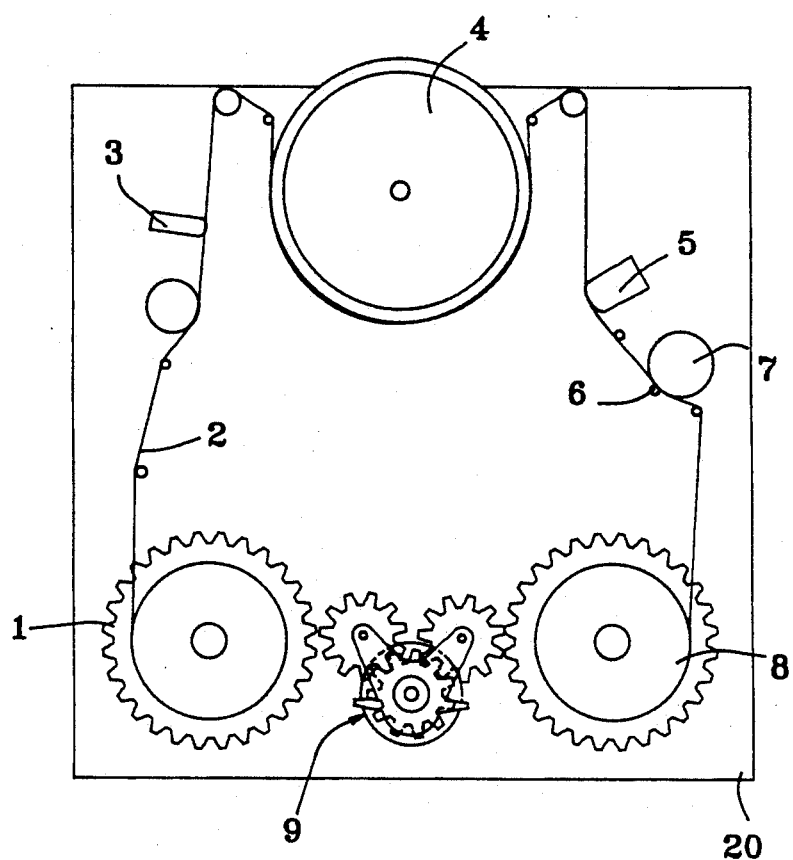
FIG. 1 is a schematic plan view of a reel driving mechanism of a VCR according to the prior art.
Figure 2:
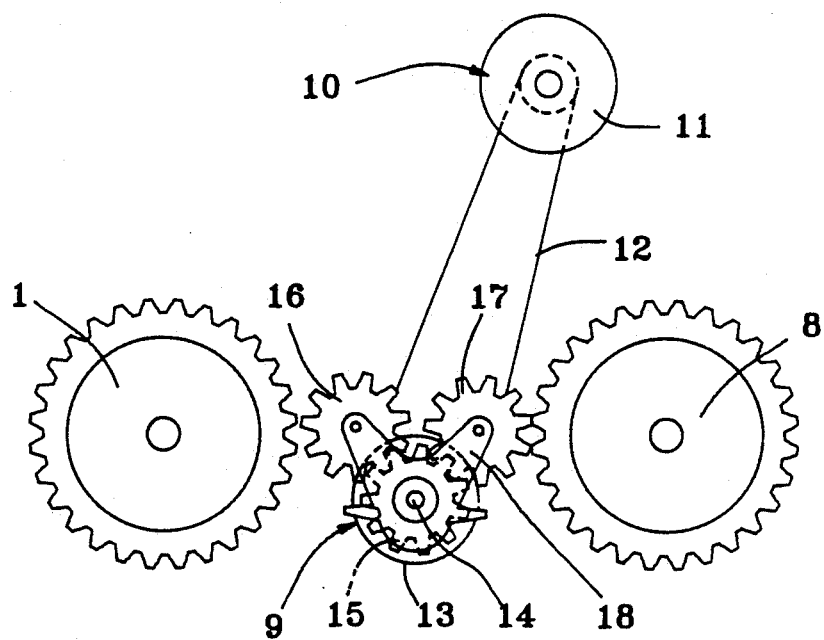
FIG. 2 is a detailed view of the reel driving mechanism shown in FIG. 1.
Figure 3:
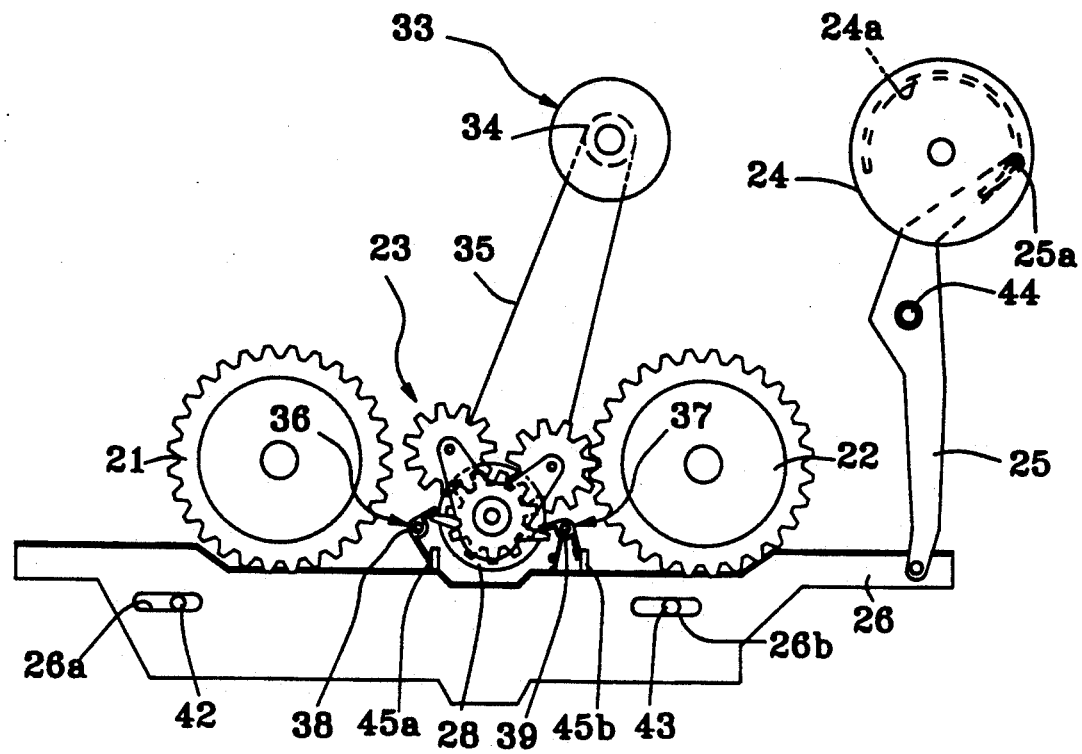
FIG. 3 is a schematic plan view of a reel driving apparatus of a VCR in accordance with a preferred embodiment of the present invention.

Referring now to FIG. 3, there is shown a reel driving apparatus of a VCR in accordance with a preferred embodiment of the present invention, which comprises an idler 23 disposed between a supply reel 21 and a take-up reel 22 rotatably mounted on a base plate 20 (see FIG. 1), a first and a second swing arms 36, 37 rotatably pivoted at a first and a second pins 38, 39 of the base plate for shifting the idler 23 clockwise and counterclockwise, and a slide plate 26 for actuating the swing arms 36, 37 by its sliding movement.

Figure 5:
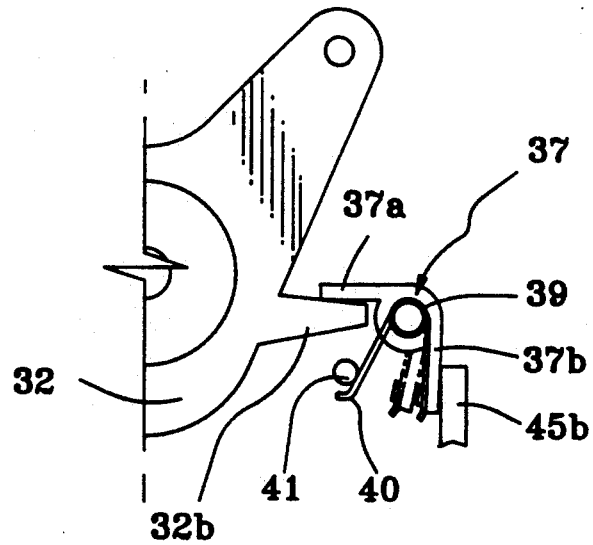
FIG. 5 is a partially enlarged view of a swing arm of the idler actuating mechanism shown in FIG. 4A.
Figure 4A:
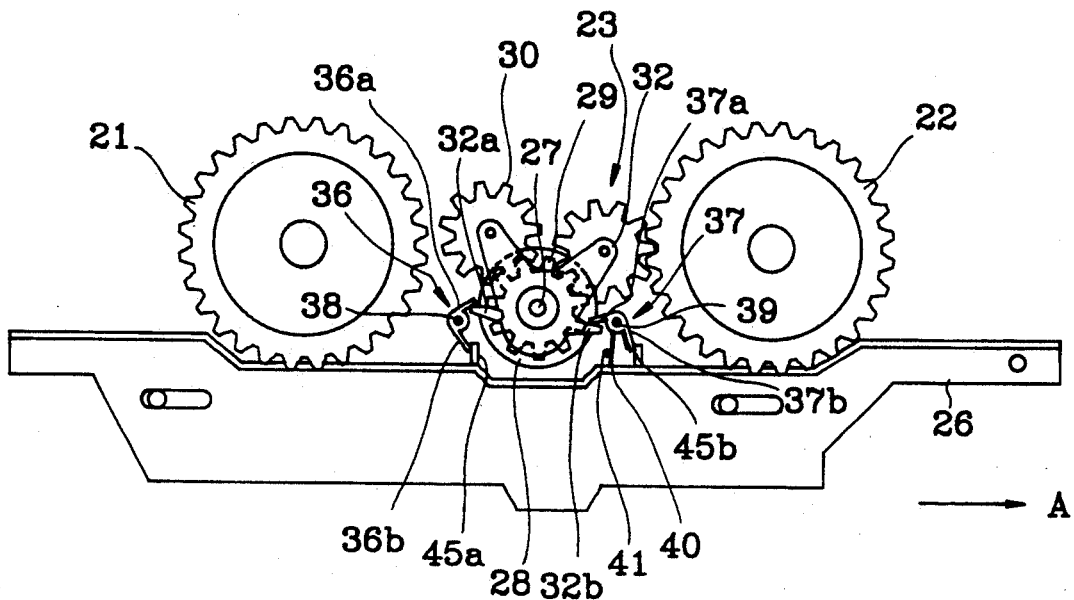
FIG. 4A shows an actuating mechanism of the reel driving apparatus shown in FIG. 3, with an idler being shifted to drive the take-up reel of the VCR.
Figure 4B:
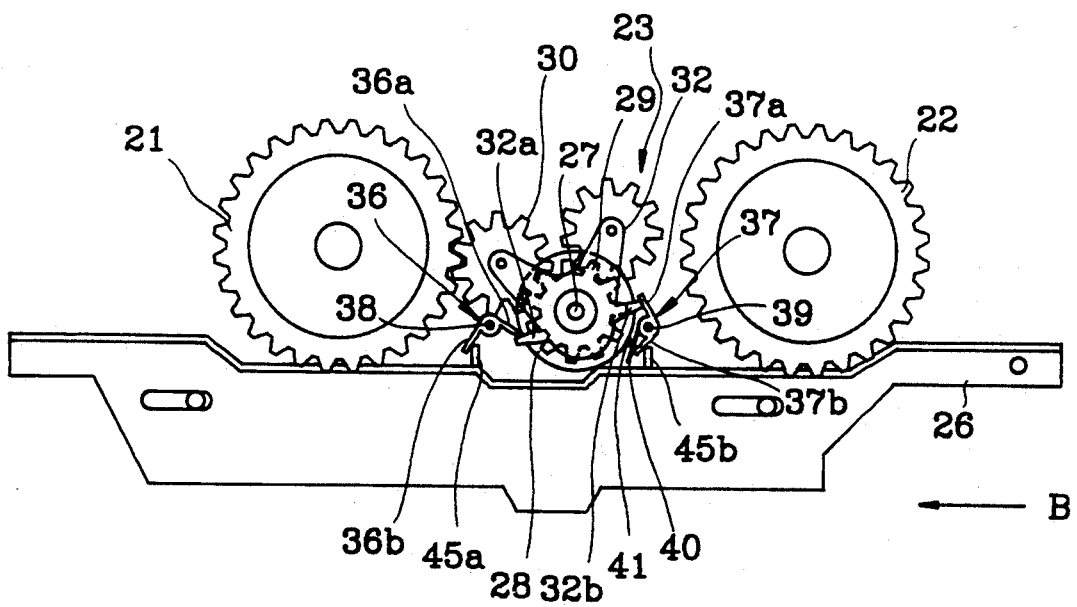
FIG. 4B is a view similar to that of FIG. 4A, but illustrates the idler shifted to drive the supply reel of the VCR.

As best shown in FIGS. 4A and 4B, the idler 23 includes a driven pulley 28, a driving gear 29 coupled, to a shaft 27 of the driven pulley 28, a first and a second driven gears 30, 31 meshed with the driving gear 29, and an idler bracket 32 for supporting the respective gears 29, 30 and 31. The driven pulley 28 is driven by a driving pulley 34 of a capstan motor 33 via a belt 35 (see FIG. 3). Accordingly, the rotating force of the driven pulley 28 is transmitted to the driven gears 30, 31 through the driving gear 29. Oppositely formed at sides of the idler bracket 32 are a first and a second legs 32a, 32b associated with the respective swing arms 36, 37 which function to shift the idler 23 to either the supply reel 21 or the take-up reel 22 as will be detailedly described hereinbelow. Each of the swing arms 36, 37 has a first and a second ends 36a, 36b, 37a, 37b arranged in a generally perpendicular relationship with each other. The first ends 36a, 37a of the respective swing arms 36, 37 are engaged with the legs 32a, 32b of the idler bracket 32 to exert their pressing forces on the idler 23, while the second ends 36b, 37b are in contact with projections 45a, 45b formed at an upper portion of the slide plate 26 and are actuated clockwise and counterclockwise by the forward and backward movement of the slide plate 26. On the other hand, the second swing arm 37 is biased in the counterclockwise direction by a torsion spring 40, thereby pressing clockwise against the idler 23. As best shown in FIG. 5, secured to the second pin 39 is the torsion spring 40, one end of which is supported at a projecting pin 41 of the base plate and the other end of which is mounted at the second end 37b of the second swing arm 37.

As shown in FIG. 3, provided at the slide plate 26 for actuating the swing arms 36, 37 is a pair of horizontally elongate slots 26a, 26b slidably engaged with guide pins 42, 43 of the base plate, respectively. In addition, an actuating lever 25 is linked to a side of the slide plate 26 at an end thereof and is rotatably mounted at a pivot pin 44 of the base plate at a middle portion thereof. Further, provided at the other end of the actuating lever 25 is a slider pin 25a which is located in a cam groove 24a of a cam gear 24 and which is moved along the cam groove 24a. Accordingly, the clockwise and counterclockwise rotations of the cam gear 24 by a cam motor (not shown) will cause the slide plate 26 to move forward and backward along the guide pins 42, 43 through the actuating lever 25, thereby enabling the idler 23 to be selectively shifted to either the supply reel 21 or the take-up reel 22 by the rotating operation of the swing arms 36, 37 associated with the projections 45a, 45b of the slide plate 26.

FIG. 4A shows the play mode operation of the VCR. In case of switching the modes, e.g., from the review mode to the play mode, the cam gear 24 is rotated counterclockwise by the cam motor and, therefore, the slide plate 26 is moved in the backward direction as indicated by the arrow A through the actuation of the lever 25. Therefore, the torsion spring 40 compressed by the second swing arm 37 is restored and the pressing force exerted downward on the first leg 32a of the idler bracket 32 is also released, due to the backward movement of the projections 45a, 45b of the slide plate 26 as shown in FIG. 4A. As a result, the restoring force of the torsion spring 40 will cause the second swing arm 37 to rotate counterclockwise, thereby enabling the first end 37a of the second swing arm 37 to press downward against the second leg 32b of the idler bracket 32. Accordingly, the idler 23 is shifted momentarily to the take-up reel 22 and, therefore, the second driven gear 31 is engaged with and drives the take-up reel 22. The take-up reel 22 is driven by the capstan motor 33 via the idler 23 to operate the VCR in the play mode. On the other hand, the drive of the capstan motor 33 begins to feed the videotape in the switched mode under the control of a microcomputer (not shown) immediately after the shifting operation of the idler has been completed. Therefore, the looseness of the videotape does not occur to thereby prevent image distortions and failures during the switching of operation mode.

Contrary to the above, as shown in FIG. 4B, in order to change from the play mode to the review mode, the cam gear 24 is rotated clockwise to thereby move the slide plate 26 in the forward direction as indicated by the arrow B via the actuating lever 25 (see FIG. 3). Therefore, the projections 45a, 45b of the slide plate 26 press forward against the respective second ends 36b, 37b of the first and the second swing arms 36, 37 due to the forward movement of the slide plate 26 to thereby rotate clockwise the swing arms 36, 37 about the pins 38, 39. In this case, the first end 36a of the first swing arm 36 presses downward against the first leg 32a of the idler bracket 32, while the first end 37a of the second swing arm 37 releases its downward pressing force from the second leg 32b of the idler bracket 32 due to the clockwise rotation of the second swing arm 37. In case of the latter, the torsion spring is compressed by the pressing operation of the projection 45b of the slide plate 26 against the second end 37b of the second swing arm 37 as indicated by the dotted line in FIG. 5. Accordingly, the clockwise rotation of the first swing arm 36 will cause the idler 23 to shift quickly to the supply reel 21, thereby enabling the first driven gear 30 to engage with and drive the supply reel 21. As a result, the VCR is operated in the review mode.

As described above, in accordance with the preferred reel driving apparatus of the present invention, the idler 23 is shifted instantaneously to either the supply reel 21 or the take-up reel 22 to operate the VCR in the required mode simply by the rotating actuation of the first and second swing arms 36, 37 caused due to the forward and backward-movement of the slide plate 26. Further, the drive of the capstan motor 33 commences to feed the video tape in the switched mode under the control of the microcomputer at the substantially same time as the completion of the shifting operation of the idler 23. For the above reasons, the looseness of the video tape is not created in the course of shifting the idler to thereby prevent image noises, distortions and failures and to maintain a good image quality during the switching of operation modes.

While the present invention has been shown and described with reference to particular embodiments, it will be apparent to those skilled in the art that many changes and modifications may be made without departing from the spirit and scope of the invention as defined in the claims that follow.

What is claimed is:

1. In a reel driving apparatus for a videocassette recorder comprising a base plate, a supply reel and a take-up reel rotatably mounted on the base plate, and an idler disposed between the supply reel and the take-up reel for transmitting selectively its driving force to either the supply reel or the take-up reel, the idler including a pulley driven by a driving pulley of a capstan motor via a belt, a driving gear coupled to a shaft of the driven pulley, a first and a second driven gears meshed with the driving gear and to be selectively engaged with the supply reel and the take-up reel, respectively, and an idler bracket for supporting the first and second gears, the improvement comprising:

a first and a second swing arms rotatably pivoted at respective first and a second pins of the base plate and associated with the idler bracket for selectively shifting the idler counterclockwise and clockwise to thereby cause the first driven gear to engage with the supply reel and the second driven gear to engage with the take-up reel, respectively;

means for biasing the second swing arm counterclockwise to cause the idler to be shifted clockwise;

a slide plate slidably mounted at guide pins of the base plate for actuating the first and the second swing arms; and a cam gear for moving the slide plate in the forward and backward directions through an actuating lever, wherein the actuating lever is rotatably mounted at a pivot pin of the base plate at a middle portion thereof, one end of the lever being pivoted to one end of the slide plate and the other end being located in a cam groove of the cam gear.

2. The reel driving apparatus of claim 1, wherein said idler bracket has a pair of legs arranged in an opposite relationship with each other; and said respective swing arms have first ends engaged with the legs of the idler bracket and second ends arranged in a generally perpendicular relationship with respect to the first ends thereof; and said slide plate has projections in contact with the second ends of the swing arms so as to actuate the swing arms through the sliding movement thereof.

3. The reel driving apparatus of claim 2, wherein said biasing means is a torsion spring secured to the second pin of the base plate, one end of the spring being supported at a projecting pin of the base plate and the other end being mounted to the second end of the second swing arm.

* * * * *